Feb. 5, 1924.  
V. C. KLOEPPER  
1,482,852  
COMBINED HYDROMETER AND LIQUID-LEVEL GAUGE  
Filed May 9, 1921
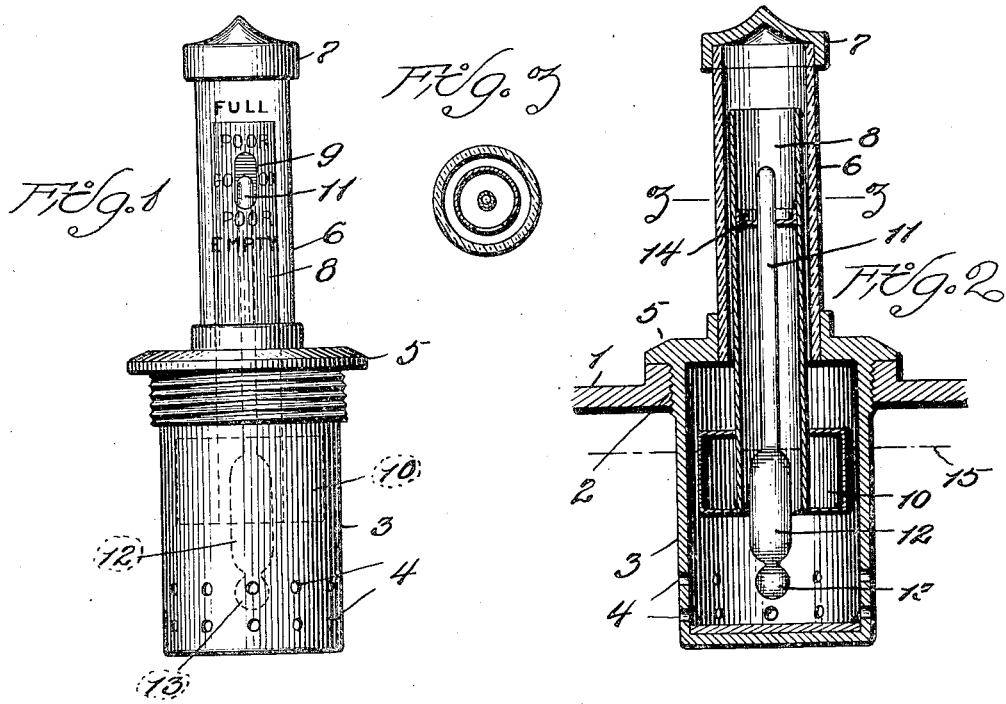
INVENTOR  
VALENTINE C. KLOEPPER,  
by Ralph Kalish — ATTORNEY.

Patented Feb. 5, 1924.

1,482,852

UNITED STATES PATENT OFFICE.

VALENTINE C. KLOEPPER, OF ST. LOUIS, MISSOURI, ASSIGNOR OF ONE-HALF TO A. J. KESSINGER, OF DETROIT, MICHIGAN.

COMBINED HYDROMETER AND LIQUID-LEVEL GAUGE.

Application filed May 9, 1921. Serial No. 467,916.

*To all whom it may concern:*

Be it known that I, VALENTINE C. KLOEPPER, a citizen of the United States, residing at the city of St. Louis, State of Missouri, have invented a certain new and useful Improvement in Combined Hydrometers and Liquid-Level Gauges, of which the following is a specification, reference being had to the accompanying drawing, forming a part thereof.

This invention relates generally to gauges and, more particularly, to a certain new and useful combined fluid quantity and quality indicating-gauge.

It is common today that many automobiles "make" oil, as it is termed; in other words, the oil in the crank-case of the automobile is generally increased in quantity and decreased in quality by gasoline working into the case from the engine-cylinders, with the result that the moving parts of the engine are insufficiently lubricated, although apparently the quantity of "oil" in the crank-case is sufficient for complete lubrication.

The principal object of my present invention is to provide a simple and efficient gauge for detecting such defective lubricating condition of the crank-case and to that end to provide a gauge which may be conveniently and inexpensively operatively installed and which functions reliably for visibly indicating both the quality and quantity of oil in a lubricant-container, such, for instance, as the crank-case of an automobile.

With the above and other objects in view, my present invention resides in the novel features of form, construction, arrangement, and combination of parts hereinafter described and afterwards pointed out in the claims.

In the accompanying drawings,

Figure 1 is an elevational view of a gauge embodying my invention;

Figure 2 is a vertical sectional view of the gauge of Figure 1 as installed in an automobile crank-case; and Figure 3 is a transverse sectional view taken approximately on the line 3—3, Figure 2.

Referring now more in detail to the said drawing, which illustrates a preferred embodiment of my invention, and in which like reference-characters refer to like parts throughout the several views, 1 indicates an automobile crank-case or other lubricant-container having an opening or aperture, as at 2, for accommodating the gauge, which, in the form thereof shown in Figures 1, 2, and 3, comprises a cup 3 which is provided with a plurality of openings or orifices 4 for communication with the interior of the crank-case or other container 1 and which forms a cage for the operating parts of the gauge. By preference, the cup or cage 3 is secured to the case 1 by threading, as shown, and is provided with a cap 5, rigidly fitting in which, and communicating with cup 3, at its lower open end is an upstanding tube 6 preferably of glass or other transparent material. Fitted upon the upper end of tube 6, is a cap 7, and properly located upon the exterior of the tube 6 are suitable quantity-gauge indicia, such, for instance, as the words "Full" and "Empty."

Located for free longitudinal movement within and relatively to the tube 6, is a preferably open-end gauge-tube 8 of thin sheet metal or other suitable material, the tube 8 being of such length as to extend at its lower portion, as shown, beyond the open lower end of tube 6 and into cage or cup 3. Adjacent its upper end, the tube 8 is provided or formed with a sight-opening, as at 9, as best seen in Figure 1, and fixed upon the lower end of tube 8, for movement in the cup or cage 3, is a suitable quantity float 10.

In turn, located for free longitudinal movement within and relatively to the quantity-gauge tube 8, is an hydrometer comprising a stem 11, a float-bulb 12, and a ballast-bulb 13, an apertured guiding-disk 14 being arranged in tube 8, as shown, for the hydrometer-stem 11.

I might here state that the depth or vertical dimension of the cup or cage 3 is in proper proportion with the "Full" and "Empty" limits of the crank-case or other container 1, and that the lengths of the shell or tube 6, the gauge-tube 8, and hydrometer-stem 11 are in proper relative proportion with the depth of the cup or cage 3.

In use or operation, assuming the container 1 to be filled wth lubricant or other fluid, indicated by the oil-level-line 15, Figure 2, the float 10 will elevate the gauge-tube 8 within shell 6 to such a position that the upper end of the tube 8 will register with full indicating indicia, such as the word "Full", upon the tube 6, and obviously the float 10 will rise and fall with the quantity of lubricant or other fluid within the container 1 and the tube 8 correspondingly at once indicate, in connection with the idicia upon the shell 6, the fluid-quantity of the container 1. Similarly the hydrometer, properly ballasted, as is well understood, will rise and fall not only with the float 10 on changes or variations in the quantity of the contained fluid, but also and especially and relatively to float 10 and its tube 8 on changes or variations in the specific gravity or quality of the contained lubricant or other fluid, and through or by its stem 11 in connection with the quality-indicia upon the float-tube 8 or shell 6 adjacent the sight-opening 9 at once indicate the condition or quality of the lubricant.

My new combined quantity and quality gauge is simple and compact in form and construction, may be inexpensively and conveniently operatively installed upon the fluid-container, and efficiently functions to visibly indicate both the quantity and quality of the contained fluid.

I am aware that changes in the form, construction, arrangement, and combination of the several parts of the gauge may be made and substituted for those herein shown and described without departing from the nature and principle of my invention.

Having thus described my invention, what I claim and desire to secure by Letters Patent is:

1. A combined quantity and quality gauge for fluid containers comprising, in combination, a tube, a float including a stem disposed for movement lengthwise within the tube, an hydrometer movable with and relatively to the float and its stem, and means including indicia upon both the stem and the tube for visibly indicating the respective fluid actuated quality and quantity positions of the hydrometer and float.

2. A combined quantity and quality gauge for fluid containers comprising, in combination, a transparent tube, a float including an apertured stem disposed for movement lengthwise within the tube, an hydrometer movable with and relatively to the float and its stem, indicia upon the tube for visibly indicating the fluid actuated quantity position of the float, and indicia upon and at the aperture of the stem for visibly indicating the fluid quality actuated position of the hydrometer.

In witness whereof, I have signed my name to this specification.

VALENTINE C. KLOEPPER.